United States Patent [19]

Pertzsch et al.

[11] Patent Number: 4,884,158
[45] Date of Patent: Nov. 28, 1989

[54] MAGNETIC TAPE CASSETTE HAVING A SPRING-BIASED FRONT PANEL AND LOCKING MEMBER

[75] Inventors: Albert Pertzsch, Munich; Hubert Brunner, Weil; Ludwig Zeroni, Ottobrunn, all of Fed. Rep. of Germany

[73] Assignee: Agfa-Gevaert Aktiengesellschaft, Leverkusen, Fed. Rep. of Germany

[21] Appl. No.: 49,288

[22] Filed: May 13, 1987

Related U.S. Application Data

[63] Continuation-in-part of Ser. No. 793,183, Oct. 31, 1985, abandoned.

[30] Foreign Application Priority Data

Nov. 10, 1984 [DE] Fed. Rep. of Germany ....... 3441156

[51] Int. Cl.⁴ .............................................. G11B 23/087
[52] U.S. Cl. .................................... 360/132; 242/198; 242/199
[58] Field of Search ............................ 360/85, 95, 132; 242/197–199; 206/387; 220/334, 341

[56] References Cited

U.S. PATENT DOCUMENTS

| | | | |
|---|---|---|---|
| 4,466,583 | 8/1984 | Giannis et al. | 242/198 |
| 4,524,927 | 6/1985 | Sieben | 242/198 |
| 4,527,691 | 7/1985 | Pertzsch et al. | 206/387 |
| 4,591,936 | 5/1986 | Kikuya et al. | 360/132 |

FOREIGN PATENT DOCUMENTS 8121098  7/1981  Fed. Rep. of Germany ...... 360/132

*Primary Examiner*—Stuart N. Hecker
*Assistant Examiner*—Benjamin E. Urcia
*Attorney, Agent, or Firm*—Connolly and Hutz

[57] ABSTRACT

A magnetic tape cassette, particularly a video tape cassette which is provided with a hinged front panel prestressed by a tension spring, the coil of which is positioned on an axle on the inside of the side wall of the front panel. The free end of the long spring leg grips beneath the front of an upper housing half of the cassette, which constrains the long spring leg. A lower housing half has a hinged locking plate on the inside, in the area of the front panel. The locking plate has a obliquely extending projection projecting over the plate, which projection being eccentric to the center of rotation of the plate has a surface off set from the axis of rotation of said hinged locking plate, and on the surface of oblique projection the long spring leg stressed between the upper housing half and the projection of the plate to produce a moment of force on the plate tending to swing the plate on the axis of rotation.

5 Claims, 2 Drawing Sheets

MAGNETIC TAPE CASSETTE HAVING A SPRING-BIASED FRONT PANEL AND LOCKING MEMBER

CROSS REFERENCE TO RELATED APPLICATION

This is a continuation-in-part application of U.S. application Ser. No. 793,183 filed Oct. 31, 1985 by Albert Pertzsch et al entitled "A Magnetic Tape Cassette," now abandoned.

INTRODUCTION

The present invention relates to a magnetic tape cassette, with a hinged front panel prestressed by a spring.

BACKGROUND OF THE INVENTION

The cassette housing of a video tape cassette, for example, of the VHS type, is provided with a hinged front panel as a cover, which protects the magnetic tape of an unused cassette from dirt. The front panel opens when the cassette is placed in the video recorder. In order to prestress the opening and locking device, there is an axle positioned on the inside of the front panel covering the side, which axle bears a spring coil and the long spring leg of which is positioned on the front panel. This is only the case with preassembled springs in the front panel, otherwise, the support takes place in the upper part of the housing. The front panel is at the same time maintained in a closed state by a locking plate. Small coiled spring (DE 28 37 889) or a plate spring (DE 28 37 890), which on the one hand act on the locking plate, and on the other hand are supported on a fixed wall of the housing, are used for the locking device. The two spring combinations operate perfectly, their disadvantages, however, can be easily recognised, for example, a high number of parts for the locking device, costly testing assembly, construction, which takes place in successive sections. In U.S. Pat. No. 4,466,583 and DEGM 81 21 098 a sprayed on plastics material spring for the locking plate is described in each case, which reduces the number of parts, as mentioned above. In both cases, the plastics materials spring is sprayed on in the area of the hinged axle, while the free end of the spring is positioned on the housing wall, which seals off the space behind the locking plate. Since the centre of rotation and the point of application of force are positioned relatively far apart from each other, material fatigue is to be expected after a certain time owing to the relatively great spring deflection when opening the locking plate, when on moving the spring, the elastic deformation area is left. For achieving the necessary spring forces, a correspondingly thin material cross section must be selected for the plastics material spring, which, however, also impairs the injectability.

SUMMARY OF THE INVENTION

The object of the present invention is to achieve the sealing of the front panel and the locking thereof without using two independently active springs, whereby it is not necessary to reconstruct an optionally existing injection moulding die, and also a simplified assembly is involved.

According to the present invention there is provided a magnetic tape cassette, particularly a video tape cassette, having an upper housing half and a lower housing half and a hinged front panel which is prestressed by a spring having a coil portion and a long leg and a short leg. The coiled spring is mounted on an axle on the inside of the side wall of the front panel, and a free end of the long spring leg grips the upper housing half from below. The lower housing half has a hinged locking plate on the inside, in the area of the front panel. The plate is pivotally mounted on the lower housing half by a pair of axle pins. The locking plate has an obliquely running projection projecting at a narrow angle from the plane of orientation of the plate. The projection being offset is eccentric to the centre of rotation of the plate on the pins. The free end of the long spring leg is positioned or the offset upper end of the projection.

In the device according to the present invention, a spring on the locking plate is superfluous. By acting in conjunction with the offset projection and the upper housing half the spring on the front panel takes up a double function, namely the springing of the front panel and pressing on the locking plate. This again represents a reduction in material costs, a reduction in storage, and not least a simplification in assembly when constructing the cassette, whereby the front panel and the lower half of the casing only need to be inserted into each other.

BRIEF DESCRIPTION OF THE DRAWINGS

A preferred embodiment of the invention will now be explained in more detail, by example only with reference to the accompanying drawings, in which.

DESCRIPTION OF FIG. 1

Figure 1:
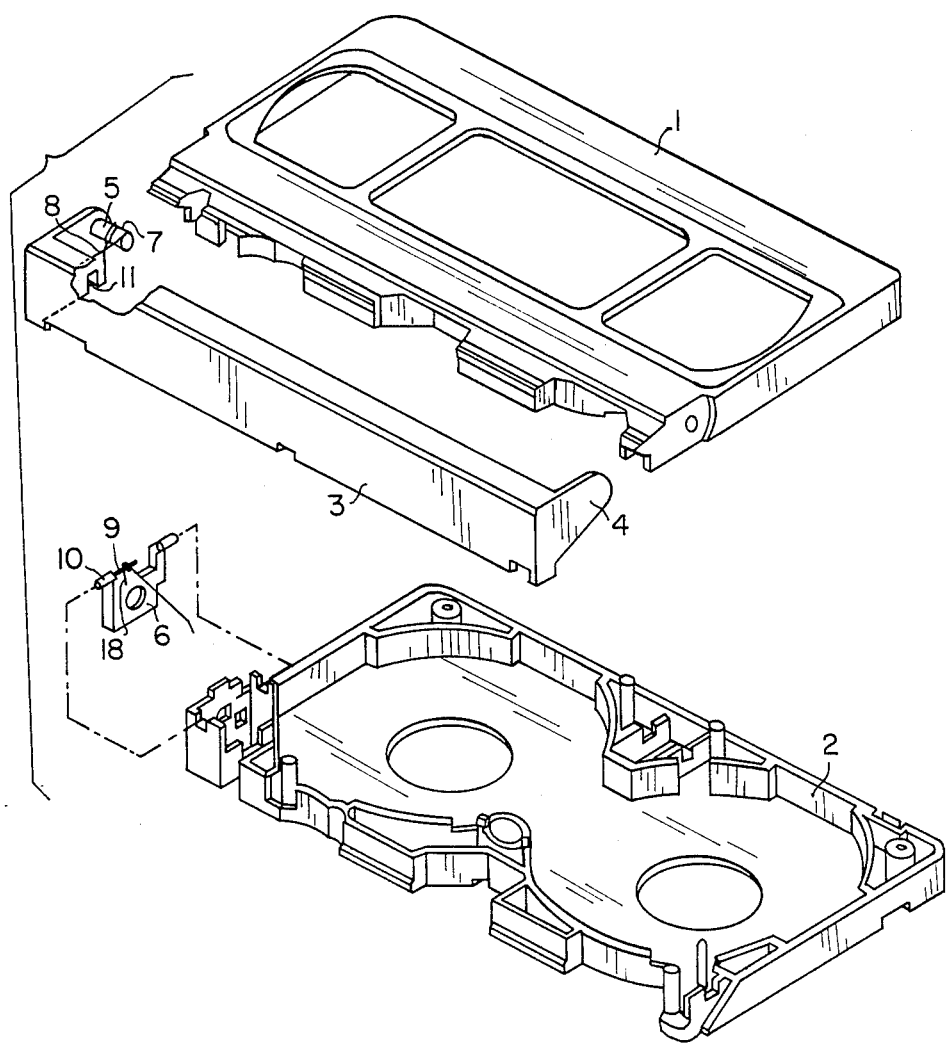
FIG. 1 shows an exploded, perspective view of a video tape cassette with upper and lower housing halves, front panel, locking plate and the two springs according to the prior art.

FIG. 1 shows a video tape cassette of the type described consisting of an upper and a lower housing half 1 and 2 which are screwed together during construction. The magnetic tape passes from the unwinding reel past the front edge of the housing and is wound onto the winding reel (tape and reels not shown). A front panel 3 with side walls 4, on the inner sides of which pegs 5 are injected, around which the front panel 3 can be hinged, serves to protect the tape from dirt. In the lower half of the housing, a hinged locking plate 6 is pivotally supported by a pair of axle pins 10 on the lower housing half 2. The hinged locking plate 6 is engageable with a recess 11 positioned in the side wall 4 of the front panel 3. A spring 7 with coil 16 is prestressed in the front panel by having the spring coil 16 positioned on the axle 5 and a long spring leg 8 gripping under the front panel 3. A second or locking spring 9 is positioned with its coil on an axle pin 10 of the locking plate 6, whereby the short spring leg 18 is positioned on the locking plate and the long spring leg, not shown, is supported on a base in the lower half 2 of the housing.

DETAILED DESCRIPTION

Figure 2:
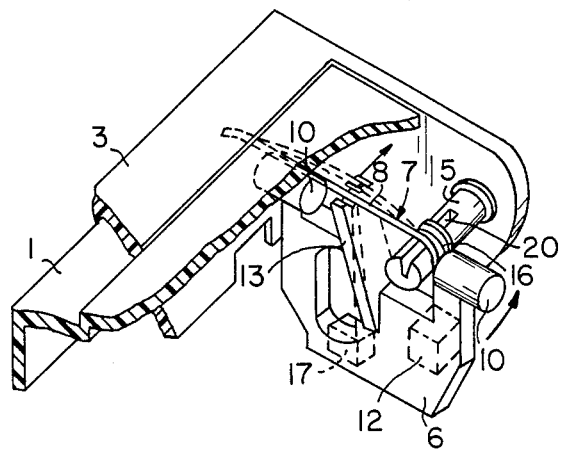
FIG. 2 shows a perspective view of part of the front panel and upper housing half together with the locking plate with a projection according to the invention.
Figure 3:
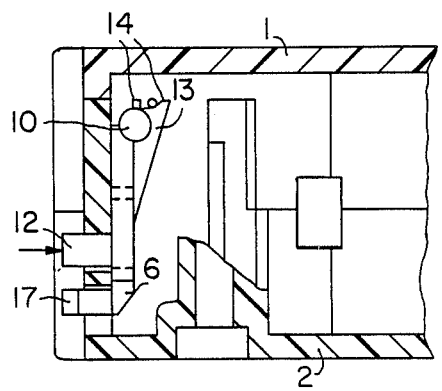
FIG. 3 shows a cross section drawing according to FIG. 2
Figure 4:
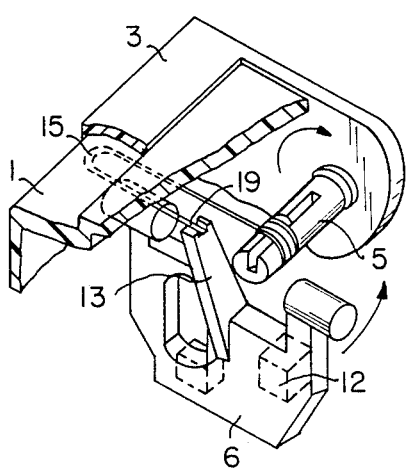
FIG. 4 shows a perspective drawing according to FIG. 2, with a modified front panel spring.

The present invention illustrated in FIGS. 2, 3 and 4 is made up of a cassette with an upper housing half 1, a lower housing half 2 as shown in FIG. 1, and a front panel 3 hingedly mounted in the upper housing half 1 on pegs 5, as shown in FIG. 2. The locking plate 6 has axle pins 10 which pivotally support the plate 6 on the lower housing half 2 similarly to the structure illustrated in FIG. 1, and the plate 6 has a pawl 17 which engages the front panel 3 in the recess 11.

The locking plate 6 can be released from engagement of the pawl 17 with the front panel 3 by means of engagement of projection 12 shown in FIG. 3 and thus the front panel 3 can be unlocked.

One of the two springs of the cassette of FIG. 1 that is the locking spring, is omitted when an obliquely running projection 13 is formed with the locking plate 6, as shown in FIGS. 2, 3, and 4, such that it is offset and lies eccentric to the centre of rotation of the locking plate 6 on the pins 10. The spring 7 is mounted on peg 5 as shown in FIGS. 2 and 4 with its coil 16 fixed on the peg 5 and a short leg positioned in a slot 20 in the peg 5. The long spring leg 8 extends from the coil 16 and the peg 5. The projection 13 projects over the upper edge of the plate and the long spring leg 8 positioned extending substantially parallel to the axis of rotation of pins 10 and seating on the free end of the projection 13.

In assembly of the parts of the cassette according to this invention, the upper housing half 1, the lower housing half 2, and the front panel 3 are brought together so that the spring leg 8 is gripped from below by the projection 13 and the free end of the leg 8 being positioned under the upper housing 1 as shown in FIG. 2 is in opposition to the force applied by the projection 13 and the spring leg is consequently prestressed. The spring leg 8 by the contact at the upper end of the oblique projected offset projection 13 applies a force having a component which swings the plate 6 on the axis of the pins 10 and urges plate 6 toward the side wall 4 and the pawl 17 into engagement with recess 11, which recess 11 is illustrated in FIG. 1.

The coil 16 of spring 7 is fixed on the peg 5 by the anchoring in the slot 20 and with the long leg 8 gripped under the upper housing half 1, the coil 16 is held under tension when the front panel is in closed position. This tension in coil 16 results in a force tending to rotate the peg 5 and thus move the front panel to open position. As shown in FIG. 3 the front panel can be released to move toward open position by depressing projection 12 which is accessible by the operator and consequently disengaging the pawl 17 from the recess 11 and the front panel 3, not shown in FIG. 3. The release of the panel 17 from the recess 1 frees the front panel 3 from the restraint and permits it to move to the open position.

Thus according to this invention the combination including the spring 7 and its component leg 8 and coil 16 together with the projection 13 effect a dual function. The coil 16 with the short spring leg anchored in the slot is tightened and under stress when the front panel is in closed position. This results in a force tending to rotate the peg 5 and consequently open the front panel 3.

The prestressing of the long spring leg 8 on the obliquely offset projection 13 tends to swing the plate 6 on the axis of the axle pins 10 to force and hold the pawl 17 in the recess 11 and hold the front panel 3 in closed position.

For the lateral guiding of the spring leg 8, the projection 13 has a more or less fork-shaped recess 14 on the upper edge. With this design of the locking device, in addition to the material saving of one spring and the storage costs and testing costs associated therewith, the assembly of the front panel and lower half of the housing can be automated in simple manner. A further advantage of the invention, is that the projection can also be injected at a later date on the locking plate, by simple modification to the injection device, however, it is not necessary to reconstruct an injection device for incorporating the projection.

A further advantage of the invention is that the spring-prestressing can be varied. The tendency of the force of the spring-prestressing of the spring leg 8 on the obliquely oriented projection 13 to produce movement of the plate 6 around the axis of rotation provided by the axle pins is the moment of that spring-prestressing force. This moment of force can be adapted and modified. Depending on whether the obliquely running projection 13 is positioned closer or further from the centre of rotation of the axle pins 10 the locking plate 6, the spring-prestressing is smaller or greater.

The spring 7 which provides the spring-prestressing can likewise be modified. In place of the long leg wire spring illustrated in FIG. 2, a spring according to FIG. 4 may be used. A long spring leg 15 is bent in a U. The 180° bend is positioned, in the assembled state, under the upper housing half 1 that is at the position at which the spring leg 8 according to FIG. 2 ends. The extended spring leg 15 ends close to the spring coil 16 and comes to rest on the projection 13.

The assembly of the cassette with the modified extended spring leg 15 may be performed in the following manner: First, the lower cassette housing half 2 is assembled with the reels and the locking plate 6. On the other hand the spring 7 is inserted on the peg 5 of the front panel and afterwards the front panel is assembled with the upper housing half. In this stage the U-shaped leg 15 of the spring 7 already grips under the upper housing. In a last step the upper housing half together with the front panel 3 is assembled with the lower housing half 2 including locking plate 6 and by doing this the free end 19 of the spring 7 comes to lie automatically in the fork-shaped recess 14 of the locking plate. The extended arm of the front panel spring can also be bent towards the adjacent side wall of the housing.

It is a feature of this invention that the locking plate 6 may be composed of a plastic material which is shaped by injection molding. The projection 13 consists of this same material and molding procedure.

It is a feature of the present invention as illustrated in the FIGS. 2, 3 and 4 that the surface of projection 13 on which the force of spring leg 8 is applied is positioned above the plate 6 in the upper and lower relationship of the cassette parts. Particularly in the illustrated embodiments the projection surface is above the axis of rotation of the pins 10.

The arrangements according to the invention require no modification of the housing sections of the tape cassette.

We claim:

1. In a cassette for magnetic video tape, the combination of
   a two part housing with
   an upper housing
   a lower housing
   said upper and lower housings each having side walls and a front wall formed with apertures,
   a front panel pivotally mounted on the side walls so as to have an open position and a closed position with respect to the apertures wherein the front panel covers said apertures when in said closed position, and permits access through said apertures when in said open position, side parts of the front panel partly overlapping the side walls, at least one peg carried on the inside of said side and extending towards the inside of the cassette, and having a recess formed in said peg, a coil spring mounted on said peg, having a long leg and a short leg forming the respective ends of the coil, said short leg being seated in the peg recess to fix the coil spring on the peg, a locking plate mounted on the lower housing half, means for swiveling the plate on supports in the lower half having a plane oriented along the height dimension so that the plane is positioned inside of the front part of the side walls and the side parts of the front panel, said plate swiveling on the axis of rotation of said swiveling means, means on the plate for engaging the front panel so as to hold the panel in said closed position over the apertures when the plate is engaged with the front panel and to be disengageable upon swiveling of the plate, a projection of said plate extending obliquely from the plane of the plate along the height dimension and having a surface offset from the axis of rotation of the swivel means, the projection being constructed to that the long leg engages the projection surface and upper housing half and applies a force producing an angular moment in the plate.

2. A magnetic tape cassette according to claim 1, wherein the projection surface of the oblique projection has a fork-shaped recess for said engagement of the spring long leg with said surface.

3. A cassette as claimed in claim 1, wherein the projection surface of the oblique, projection is positioned above the plate.

4. A cassette as claimed in claim 1 wherein the plate and the oblique projection are integral in a molded product.

5. A magnetic tape cassette according to claim 1, wherein the long spring leg having a 180° bend is shaped in a U and has the free end adjacent to but spaced from the spring coil, whereby the free end of the spring leg is prestressed by by engagement on the surface of the projection.

* * * * *